United States Patent [19]

Aoki

[11] Patent Number: 5,820,236
[45] Date of Patent: Oct. 13, 1998

[54] UFO FLAP

[76] Inventor: John K. Aoki, 39553 County Rd., 17A, Woodland, Calif. 95695

[21] Appl. No.: 867,937

[22] Filed: Jun. 3, 1997

[51] Int. Cl.⁶ ................................................ A47B 97/00
[52] U.S. Cl. ........................ 312/223.2; 312/296; 361/684
[58] Field of Search ............................. 312/223.2, 223.6, 312/236, 213, 210, 293.3, 296; 361/684; 360/97.02, 137; 454/184, 259; 174/65 R, 66

[56] References Cited

U.S. PATENT DOCUMENTS

| 4,094,561 | 6/1978 | Wolff et al. ........................... 312/223.6 |
| 4,372,629 | 2/1983 | Propst et al. .......................... 312/223.6 |
| 4,557,095 | 12/1985 | Rice et al. .................................. 52/473 |
| 4,652,976 | 3/1987 | Fushimoto ............................... 361/684 |
| 4,980,785 | 12/1990 | Talmadge .............................. 360/97.02 |
| 5,163,870 | 11/1992 | Cooper ..................................... 454/184 |
| 5,187,645 | 2/1993 | Spalding et al. .................. 312/223.2 X |
| 5,199,776 | 4/1993 | Lin ......................................... 312/293.3 |
| 5,212,899 | 5/1993 | Fandreyer .............................. 174/66 X |
| 5,265,951 | 11/1993 | Kumar .................................. 312/223.2 |
| 5,514,036 | 5/1996 | Lin .......................................... 454/184 |
| 5,542,757 | 8/1996 | Chang .................................. 312/223.2 |
| 5,559,672 | 9/1996 | Buras, Jr. et al. ....................... 361/684 |
| 5,710,688 | 1/1998 | Cihak et al. ............................. 360/137 |

Primary Examiner—Peter M. Cuomo
Assistant Examiner—James O. Hansen
Attorney, Agent, or Firm—Patent & Trademark Services; Joseph H. McGlynn

[57] ABSTRACT

A flexible flap that is secured over the entrance slot of a floppy disk drive for a computer. The flap completely covers the entrance slot when a disk is not inserted in the drive and, therefore, dust or other contaminants will be kept out of the disk drive. The flap is flexible so it will allow a floppy disk to be inserted into the drive through the flap which will then return to cover the opening and protect the drive when the disk is inserted.

6 Claims, 1 Drawing Sheet

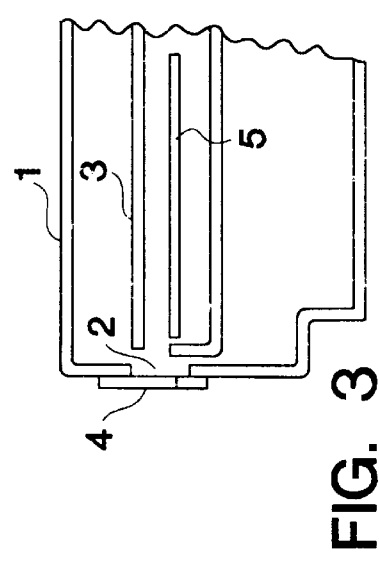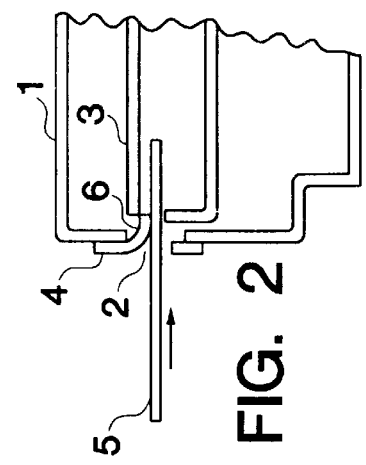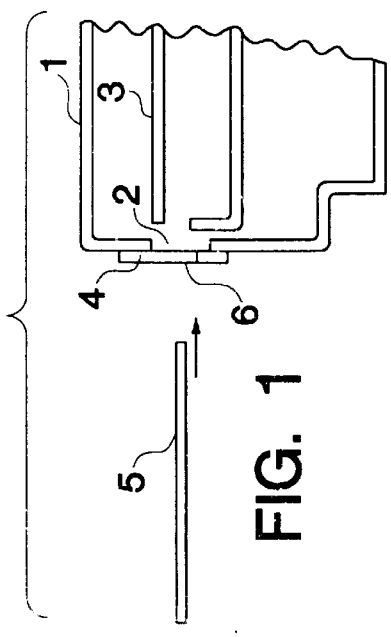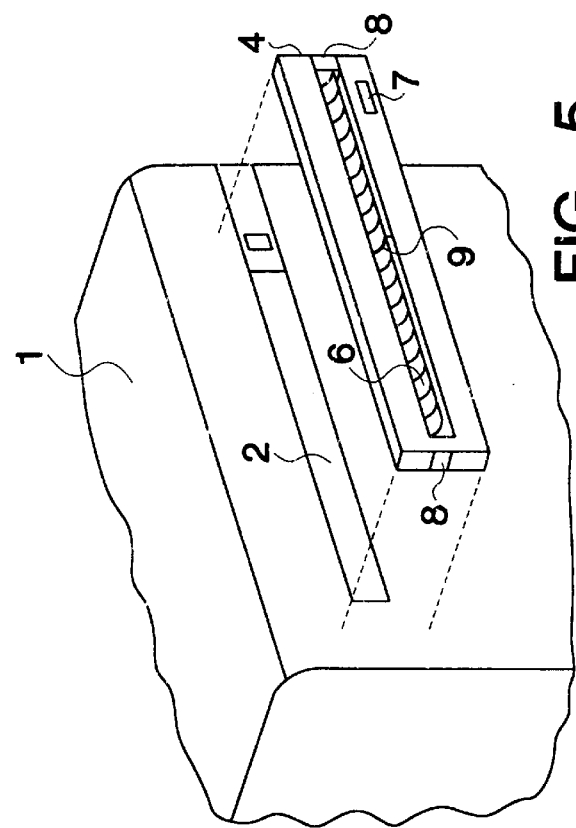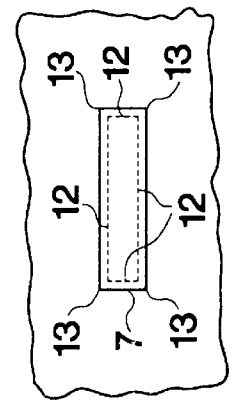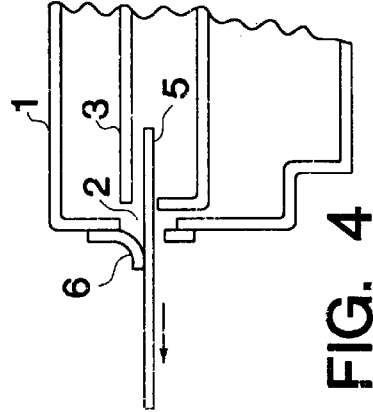

UFO FLAP

BACKGROUND OF THE INVENTION

This invention relates, in general, to covers, and, in particular, to a cover for the floppy disk slot of a computer.

DESCRIPTION OF THE PRIOR ART

In the prior art various types of protective covers for computers have been proposed. For example, U.S. Pat. No. 4,557,095 discloses a vent assembly comprising a panel with a slot and an open topped box member is secured adjacent the slot with a plate extending at an angle to partially cover the open top. U.S. Pat. No. 5,163,870 discloses a dust cover comprising a compressible seal member through which wires can be run. U.S. Pat. No. 5,514,036 discloses a filter element placed in front of the air intake on an electronics cabinet. U.S. Pat. No. 5,542,757 discloses a front panel for a disk drive which has a plurality of removable covers with apertures to allow air into the equipment.

While the prior art devices work for their intended purposes, none of the devices are directed to the problem of preventing dust or other contaminants from entering the access slot of the floppy drive on a computer. Therefore, the prior art devices do nothing to protect this delicate piece of computer equipment. If contaminants are allowed to enter the disk drive they could eventually interfere with the disk drive reading from or writing to a floppy disk. If this happens valuable data may be permanently lost. The present invention is directed to solving this problem.

SUMMARY OF THE INVENTION

The present invention comprises a flexible flap that is secured over the entrance slot of a floppy disk drive for a computer. The flap completely covers the entrance slot when a disk is not inserted in the drive and, therefore, dust or other contaminants will be kept out of the disk drive. The flap is flexible so it will allow a floppy disk to be inserted into the drive through the flap which will then return to cover the opening and protect the drive when the disk is inserted.

It is an object of the present invention to provide a protective cover for the slot of a disk drive in a computer.

These and other objects and advantages of the present invention will be fully apparent from the following description, when taken in connection with the annexed drawings.

BRIEF DESCRIPTION OF THE DRAWINGS

FIG. 1 is a side view of the present invention attached to a computer before a disk is inserted.

FIG. 2 is a side view of the present invention attached to a computer while a disk is being inserted.

FIG. 3 is a side view of the present invention attached to a computer after a disk is inserted.

FIG. 4 is a side view of the present invention attached to a computer while a disk is being removed.

FIG. 5 is a partial exploded perspective view of the present invention before it is attached to a computer.

FIG. 6 is a partial, perspective view of the side flaps of the present invention.

FIG. 7 is a front view of a punch out used with the present invention to uncover the eject button on an IBM compatible computer.

DESCRIPTION OF THE PREFERRED EMBODIMENT

Referring now to the drawings in greater detail, FIG. 1 shows a side view of a computer casing 1 having an internal disk drive 3 secured therein. The computer casing has an opening 2 through which a floppy disk 5 will be inserted so that the disk will be connected to the disk drive. It should be noted that the present invention is shown in conjunction with a 3½ inch disk drive, however, it is not limited to being used only with a 3½ inch disk drive. It can be used with any disk drive that has an aperture into which a disk can be inserted such as, but not limited to, a 5¼ inch disk drive, an optical disk drive or a Zip drive. In addition, the present invention could be used with the slots into which a removable hard disk drive is inserted or with the slot which receives PCMCIA cards.

As shown in FIG. 5, the present invention, the UFO (Unwanted Flotsam Omitter) flap, is a rectangular main body 4 which will have a low tack adhesive coating at least part of the back of the body. The adhesive should provide enough gripping strength to attach the member 4 to the CPU case 1, but should be weak enough to be easily removed should this become necessary without leaving any of the adhesive residue behind to mar the CPU case.

The body 4 will be cut to form a flexible flap 6 which will be attached to the body 4 only at the top of the body. The flap 6 will have a center cut 9 which will make the flap more flexible and easier to use. While the flap 6 is shown as being unitary with the body 4, it should be understood that this flap is integral to the main body and comprises a single unit and that the UFO flap is not disposed of two discrete components.

FIGS. 1–4 show the use of the flap of the present invention. In FIG. 1, the flap has been secured to the CPU case 1 and the disk 5 is being moved in the direction of the arrow, but has not yet entered the opening 2. The flap 6 is in its at rest position covering the slot 2.

In FIG. 2, the disk 5 has been partially inserted through the flap 6 and into the aperture 2. as can be seen, the flap 6 has been pushed inward to allow the disk to enter, but the flap will not extend far enough into the CPU case to interfere with the disk drive 3.

FIG. 3 shows the disk fully inserted into the disk drive 3 and the flap 6 has returned to its original position, where it will continue to keep out dust or other contaminants.

FIG. 4 shows the disk 5 being removed from the disk drive. As the disk 5 is ejected the flap 6 will pivot outward, allowing the disk to be removed in the normal manner. Once the disk 5 is fully removed, the flap 6 will return to its at rest position as shown in FIG. 1.

It should be noted that due to its pivoting motion, the flap will act as a sweep to remove any dirt that might be on the top of the disk 5. As can be seen in FIG. 2, the flap 6 will rub against the top of the disk 5 as the disk is being inserted. Any dirt on top of the disk will be pushed off by the flap before it can be transmitted into the interior of the CPU case and/or the disk drive 3.

Shown in FIGS. 5 and 6 is a pair of side flaps 8 which are used with older Macintosh computers. These computers have a slot 10 which is recessed into the front of the case 1. If the UFO flap is positioned over the slots 10, the slots will not be closed off and dust or dirt could be channeled down the slots 10 and directed into the interior of the CPU case and/or the disk drive 3. In order to prevent this a pair of flaps 8 are positioned on opposite sides of the UFO flap 4. The flaps 8 are partially separated from the body 4 by slits 11 on the top and bottom of the flap 8. If the the UFO flap is used on a computer with slots 10, the flaps 8 are separated from the rest of the UFO flap 4 along the slits 11, and the flaps 8 are pressed into the slots 10 to close off the slots 10 so that dirt or dust can not pass down the slots and be channeled into the interior of the CPU case and/or the disk drive 3. The back of the flaps 8 will have a low tack adhesive coating, similar to the coating on the back of the UFO flap 4, which will hold the flaps 8 within the slots 10.

In FIGS. 5 and 7 a modification 7 is shown which will allow the disk drive eject button on IBM compatible computers to project through the UFO flap 4. If the UFO flap is attached to an IBM compatible computer, the punch out portion 7 will be removed in order to allow the disk drive eject button on IBM compatible computers to project through the UFO flap 4. The removable portion 7 is a rectangular shaped portion which is separated from the body of the flap 4 along four slits 12. That is the portion 7 is separated everywhere except at the four corners 13, as shown in FIG. 7. If necessary, the four corners 13 can be removed by pressing on the portion 7, which will separate the portion 7 from the rest of the UFO flap 4. The opening provided by the removal of portion 7 will allow the disk drive eject button on IBM compatible computers to project through the UFO flap 4 in order to use the eject button in the normal manner.

Although the UFO Flap and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. An accessory for protecting a disk drive opening in a computer case comprising:

a main body having a length, width, thickness, and a front side and a back side, said main body having securing means at least partially covering said back side for attaching said main body to a computer case, said main body having an opening therethrough and a flexible flap attached adjacent said opening and closing said opening, and wherein said main body has a portion which can be completely separated from the main body, and wherein said portion which can be completely separated from the main body is a rectangular portion which has four slits separating a punch out portion from said main body.

2. The accessory for protecting the disk drive opening as claimed in claim 1, in combination with a computer case, wherein said computer case has an opening which is adapted to accept computer accessories, said main body is attached adjacent said opening in said computer case, said flap is positioned directly over said opening in said computer case, whereby an accessory may be pushed through said flap and inserted into said opening in said computer case.

3. The accessory for protecting the disk drive opening as claimed in claim 1, wherein said flap has a center cut to make the flap more flexible.

4. The accessory for protecting the disk drive opening as claimed in claim 1, wherein said slits extend completely around said rectangular portion except for corners of said rectangular portion.

5. The accessory for protecting the disk drive opening as claimed in claim 1, wherein said main body has a pair of side flaps which are partially separated from said main body by slits, said slits allow said side flaps to be pushed into slots on a face portion of a computer case.

6. The accessory for protecting the disk drive opening as claimed in claim 1, in combination with a computer case, and wherein said main body is glued to said computer case.

* * * * *